US012525424B2

(12) United States Patent
Komatsuzaki et al.

(10) Patent No.: US 12,525,424 B2
(45) Date of Patent: Jan. 13, 2026

(54) CHARGED PARTICLE BEAM APPARATUS AND REPORT CREATION METHOD

(71) Applicant: Hitachi High-Tech Corporation, Tokyo (JP)

(72) Inventors: Ryo Komatsuzaki, Tokyo (JP); Shuntaro Ito, Tokyo (JP); Hiroyuki Chiba, Tokyo (JP); Takashi Shidara, Tokyo (JP); Yoshinobu Hoshino, Tokyo (JP); Hirofumi Sato, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 487 days.

(21) Appl. No.: 18/035,589

(22) PCT Filed: Nov. 16, 2020

(86) PCT No.: PCT/JP2020/042664
§ 371 (c)(1),
(2) Date: May 5, 2023

(87) PCT Pub. No.: WO2022/102140
PCT Pub. Date: May 19, 2022

(65) Prior Publication Data
US 2023/0420214 A1  Dec. 28, 2023

(51) Int. Cl.
H01J 37/22 (2006.01)
(52) U.S. Cl.
CPC .................. H01J 37/222 (2013.01)
(58) Field of Classification Search
USPC ....................................................... 250/310
See application file for complete search history.

(56) References Cited

U.S. PATENT DOCUMENTS

2009/0039263 A1*  2/2009  Matsuoka ........... G03F 7/70616
                                                              250/311
2012/0104250 A1    5/2012  Bean et al.
(Continued)

FOREIGN PATENT DOCUMENTS

JP          60-264034 A       12/1985
JP           7-44908 A         2/1995
(Continued)

OTHER PUBLICATIONS

International Search Report (PCT/ISA/210) issued in PCT Application No. PCT/JP2020/042664 dated Jan. 19, 2021 with English translation (four (4) pages).
(Continued)

Primary Examiner — Kiet T Nguyen
(74) Attorney, Agent, or Firm — Crowell & Moring LLP

(57) ABSTRACT

An input and output device includes: an instruction analysis unit configured to generate a conversation document in which a conversation uttered by a user is converted into character string data and recognize, based on the conversation document, a conversation intention of the user including an instruction to an image acquisition device; a history retention unit configured to record, as history information, the conversation document, the conversation intention, and a response of the image acquisition device to the instruction to the image acquisition device; a difference analysis unit configured to divide a report creation period using a timing when the user issues, to the image acquisition device, an instruction including an intention to save a captured image as a boundary and output report creation information in which history information divided for each of the report creation periods, and a captured image and a differential condition corresponding to the history information are associated with each other; and a report retention unit configured to create a report for each of the report creation periods (Continued)

based on the report creation information and record the created report.

9 Claims, 7 Drawing Sheets

(56) References Cited

U.S. PATENT DOCUMENTS

2014/0067102 A1   3/2014   Sanders et al.
2022/0130031 A1*  4/2022   Woodard ................. G06T 7/70

FOREIGN PATENT DOCUMENTS

| JP | 7-85510 A | 3/1995 |
| JP | 2001-84945 A | 3/2001 |
| JP | 2012-99481 A | 5/2012 |
| JP | 2015-109612 A | 6/2015 |

OTHER PUBLICATIONS

Japanese-language Written Opinion (PCT/ISA/237) issued in PCT Application No. PCT/JP2020/042664 dated Jan. 19, 2021 (three (3) pages).

* cited by examiner

[FIG. 1]
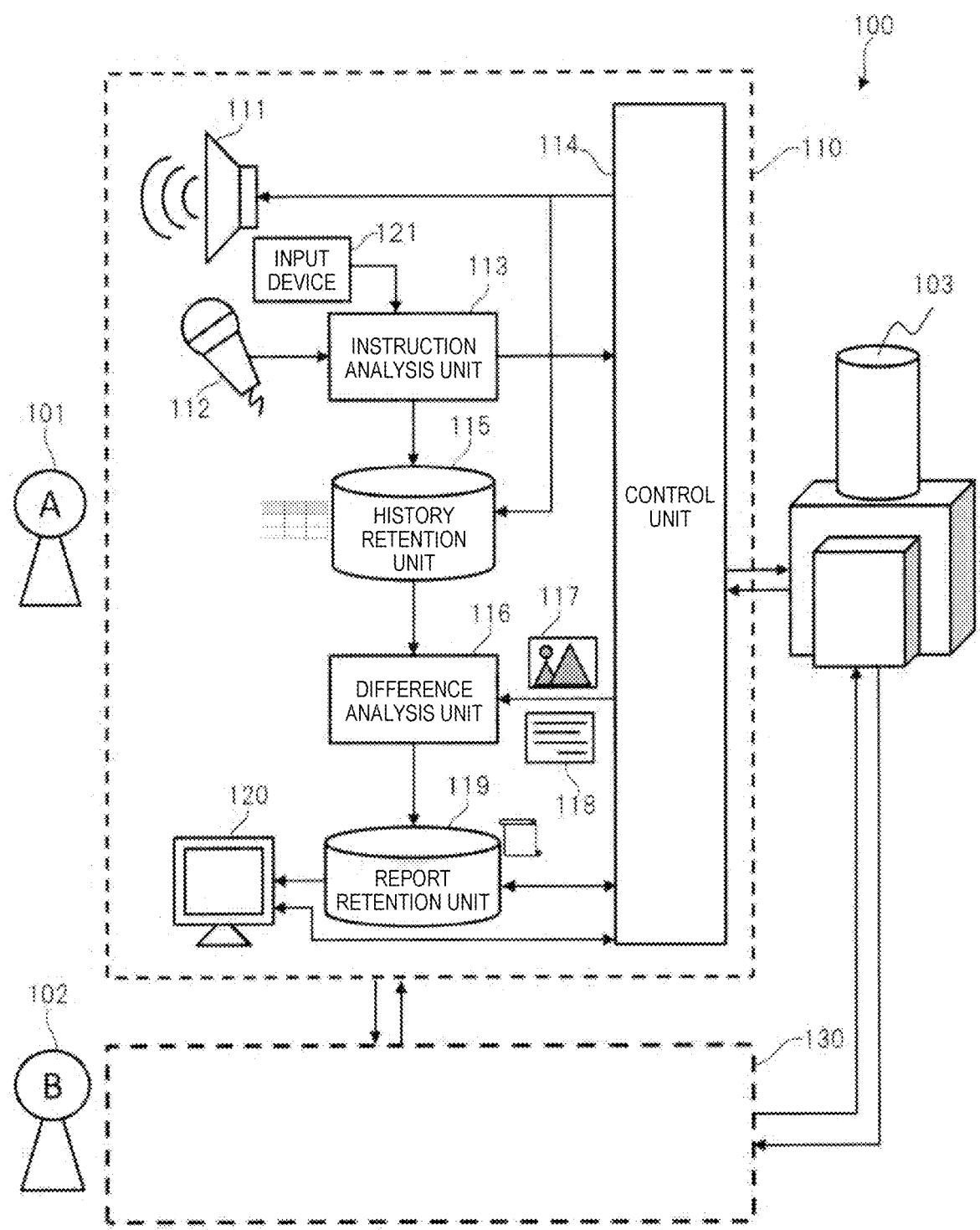

[FIG. 2]
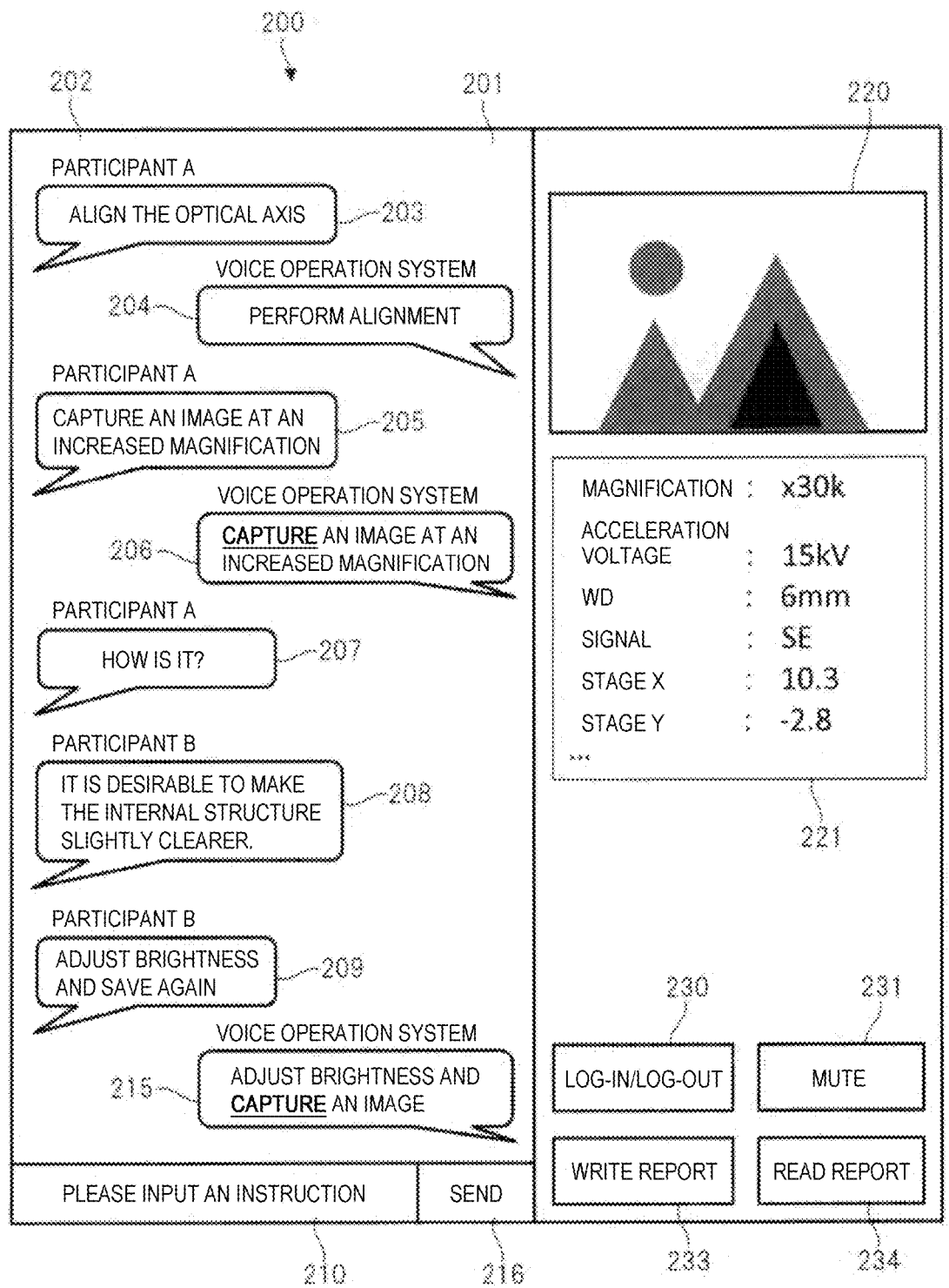

[FIG. 3]
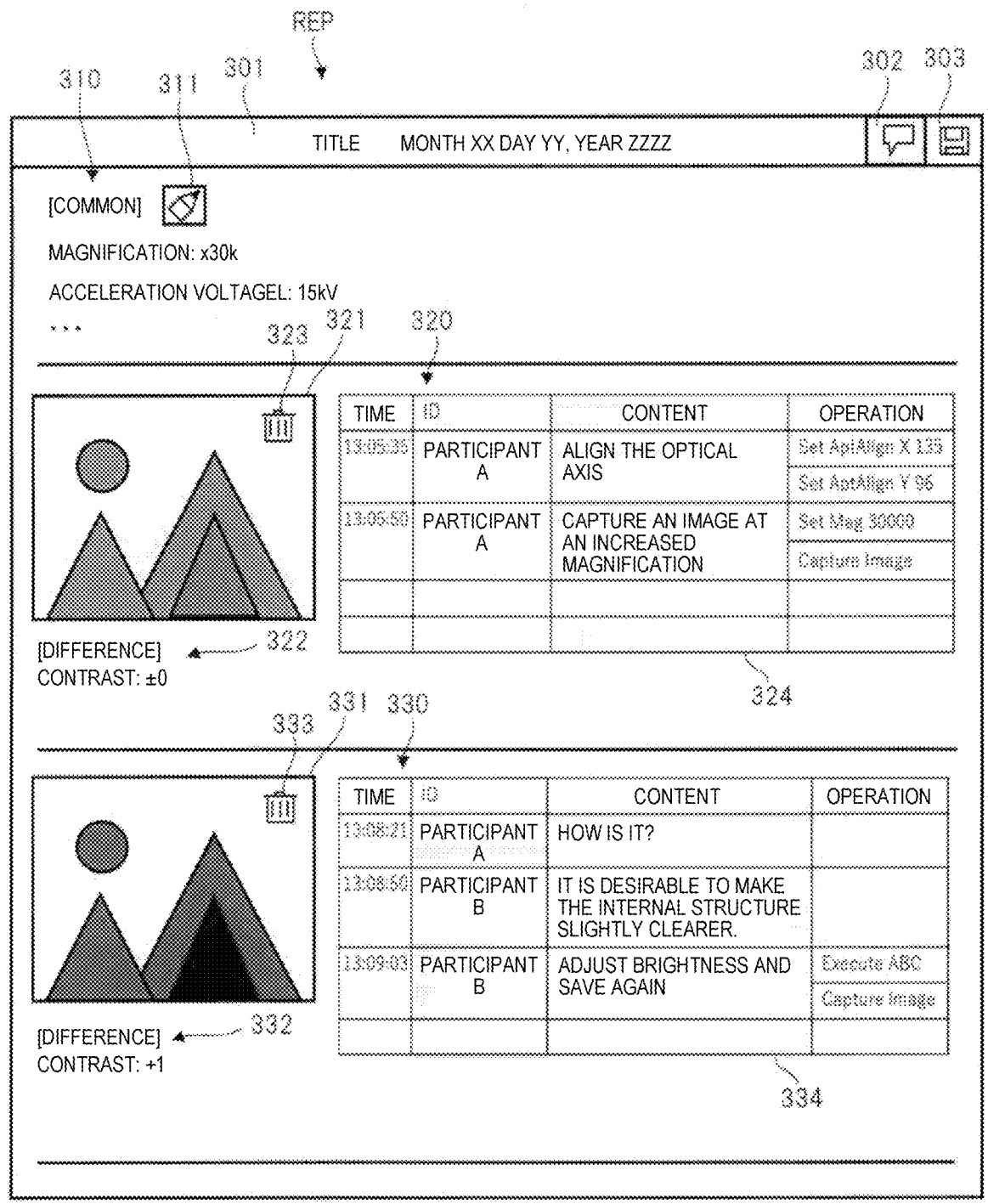

[FIG. 4]
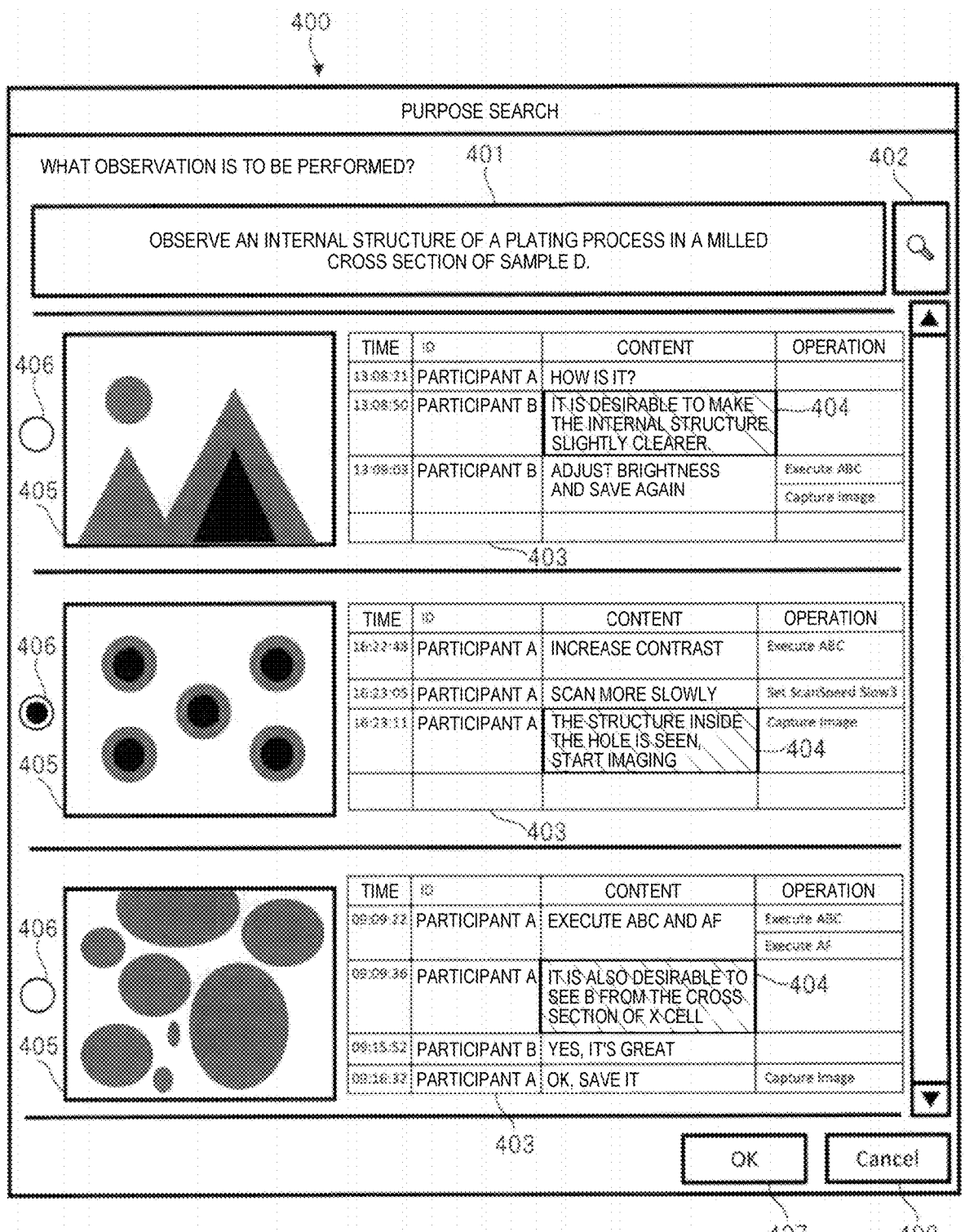

[FIG. 5]
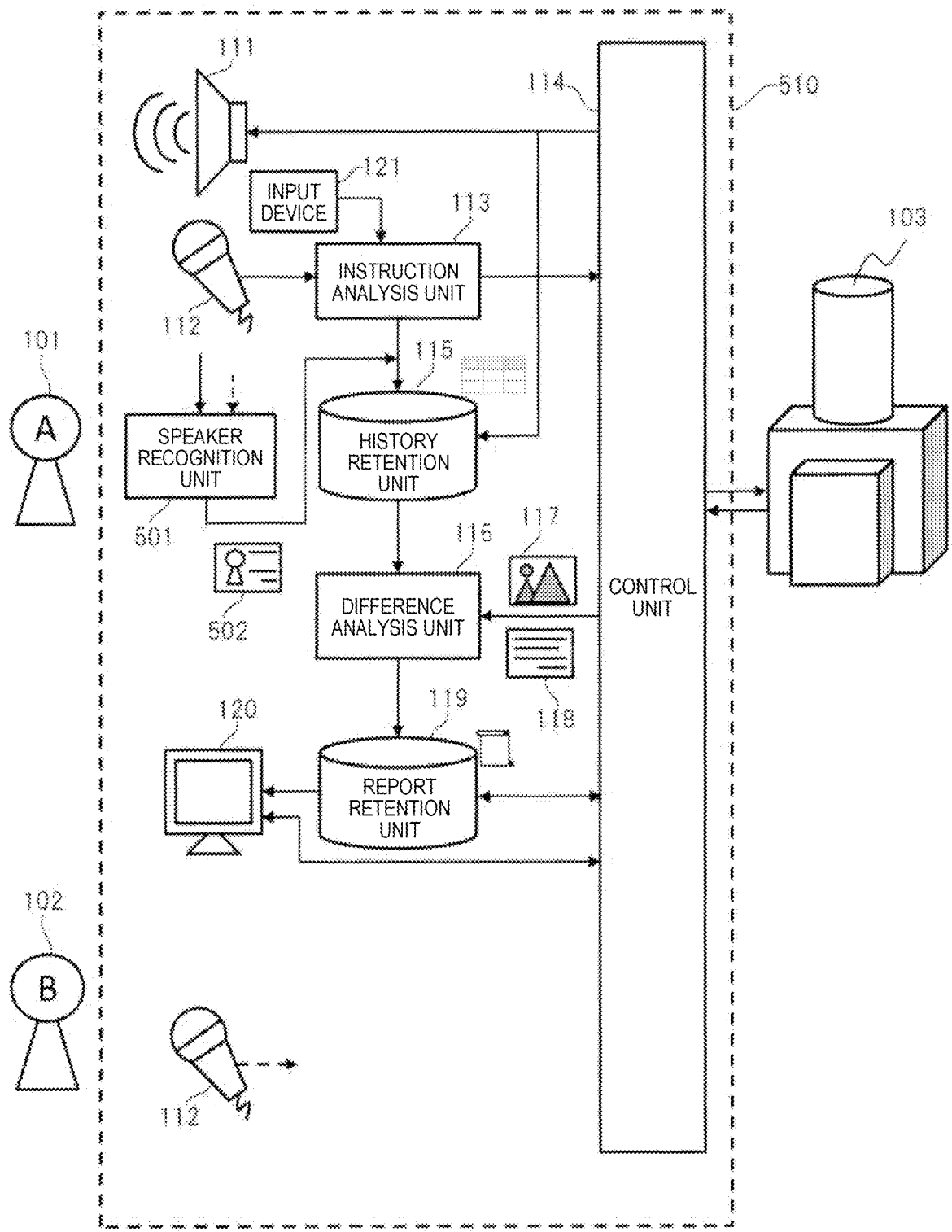

[FIG. 6]
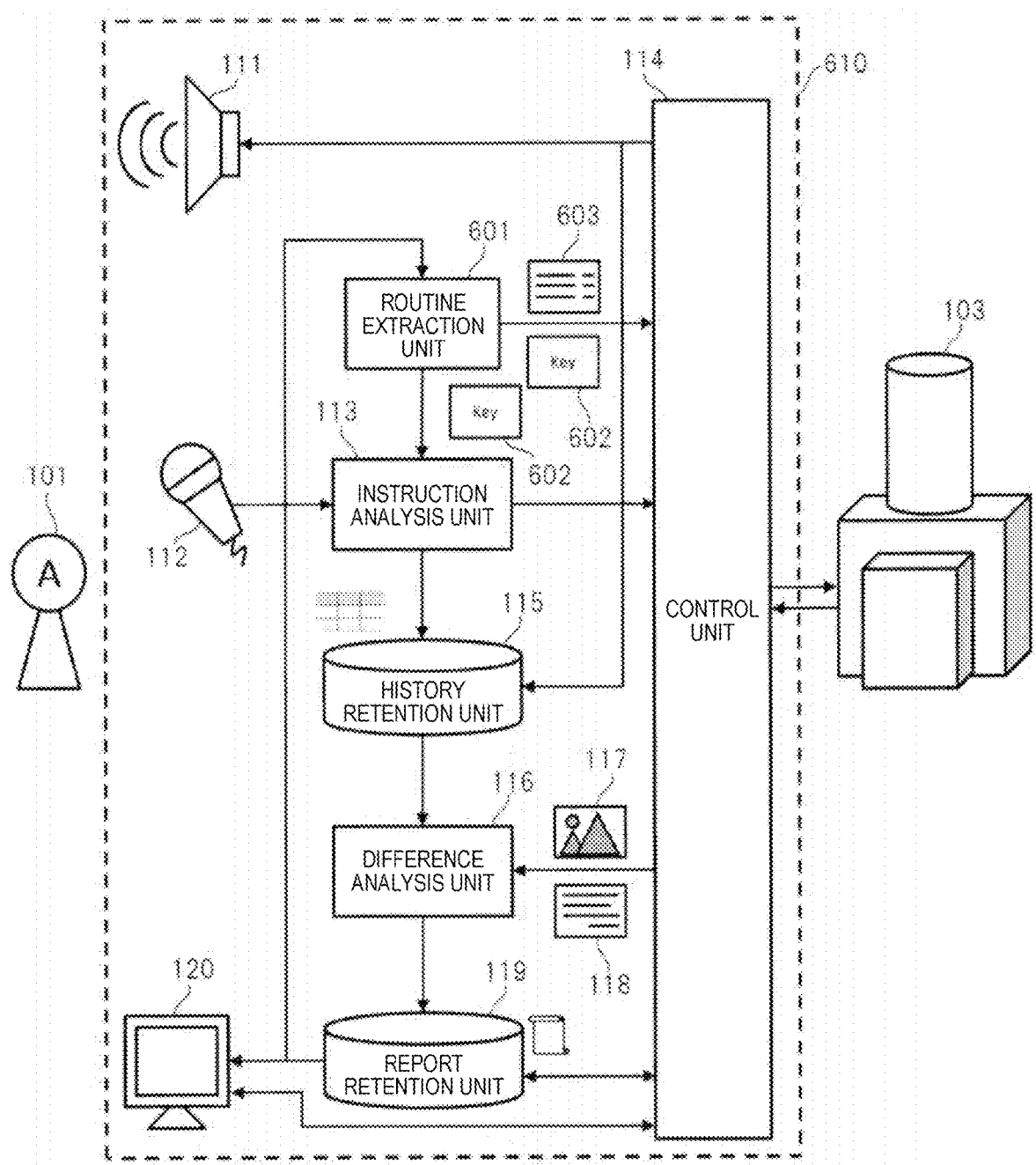

[FIG. 7]
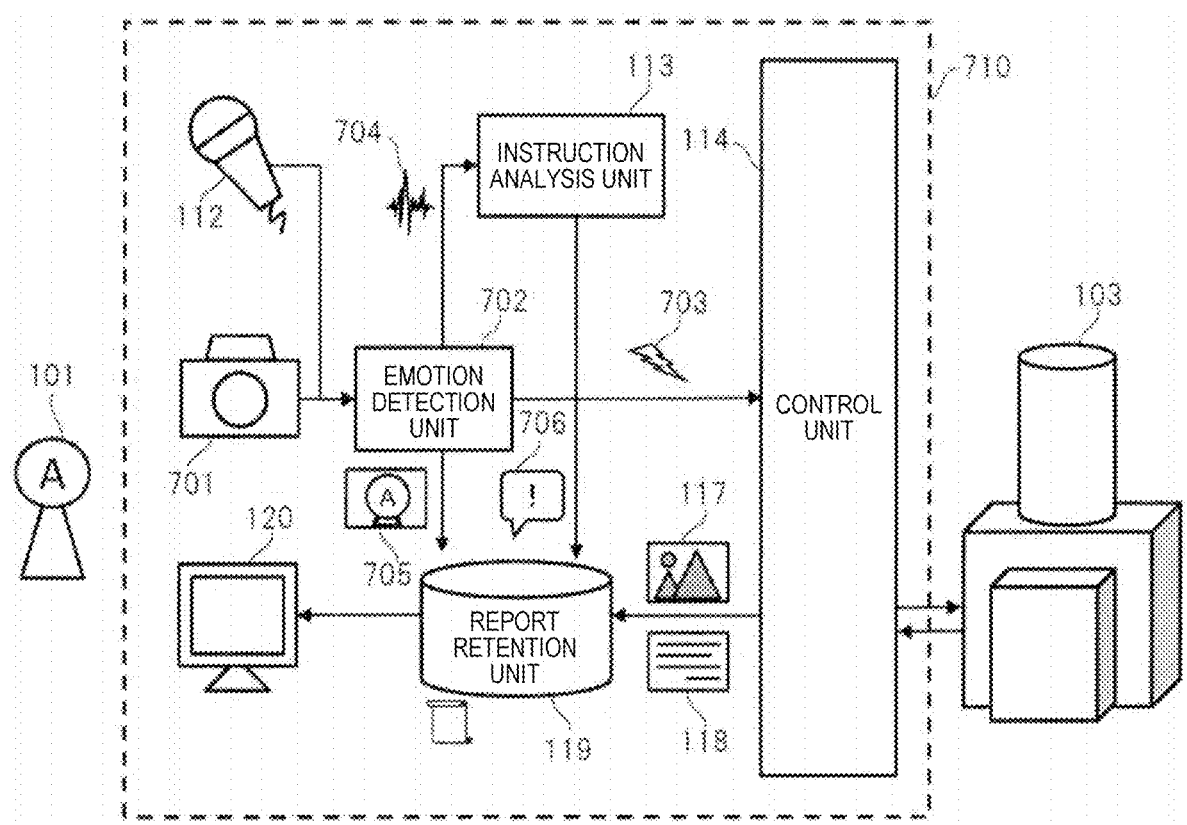

CHARGED PARTICLE BEAM APPARATUS AND REPORT CREATION METHOD

TECHNICAL FIELD

The present invention relates to a charged particle beam apparatus and a report creation method.

BACKGROUND ART

As typified by a translation machine and the like, techniques such as voice recognition and natural language processing are commercialized and expected to be used in various fields. As for a charged particle beam apparatus, experiments that require a beam to be quickly operated, such as processing on a sample that is likely to be damaged by an electron beam or real-time observation, become a trend.

To ensure validity of an observation image, it is necessary to accurately correspond with traceability between a process leading up to imaging and the observation image. Further, after an experiment using a charged particle microscope is conducted, it is generally necessary to submit a report including an observation image. However, a task of organizing a huge amount of information associated with the experiment is a burden on a user.

For example, PTL 1 discloses a technique in which an icon is displayed on an observation image and the icon provides a link to a data object including text and voice recording. Specifically, it is disclosed that more efficient acquisition and analysis of object image data are enabled by embedding and layering the voice recording in the observation image.

PTL 2 discloses a technique in which image data is acquired by extracting a still image from a moving image at a predetermined timing, voice data is acquired by extracting voice for each of speech sections separated by silence sections from voice recorded in synchronization with the moving image, and the image data and the voice data are recorded in association with each other.

CITATION LIST

Patent Literature

PTL 1: JP2012-099481A
PTL 2: JP2015-109612A

SUMMARY OF INVENTION

Technical Problem

In general, an electron microscope device records a captured image and an observation condition in association with each other, whereas it is necessary to manually record, based on an experiment note or the like, a process leading up to imaging of an observation image. However, when the process leading up to imaging is not accurately recorded due to omission or the like, the process becomes ambiguous and data reliability is impaired. Therefore, it may be difficult to reproduce an experiment. Therefore, it is fairly important to accurately record traceability between the process leading up to imaging of the observation image and the observation image in order to ensure validity of the observation image.

In addition, in order to record every step of the process leading up to imaging, for example, there is a method of recording a state of an experiment with video cameras fixed at plural locations. However, when the process is not clear from the state of the experiment alone, an operator needs to explain the state of the experiment. However, according to such a method, a burden on the operator may increase according to recording by the video cameras, management of a large amount of video data, extraction of necessary information from the video data, and the like.

An object of the invention is to provide a charged particle beam apparatus capable of easily ensuring validity of an observation image.

Solution to Problem

A charged particle beam apparatus according to the invention includes an image acquisition device configured to acquire a captured image of a sample and an input and output device configured to operate the image acquisition device. The input and output device includes: an instruction analysis unit configured to generate a conversation document in which a conversation uttered by a user is converted into character string data and recognize, based on the conversation document, a conversation intention of the user including an instruction to the image acquisition device; a history retention unit configured to record, as history information, the conversation document, the conversation intention, and a response of the image acquisition device to the instruction to the image acquisition device; a difference analysis unit configured to divide a report creation period using a timing when the user issues, to the image acquisition device, an instruction including an intention to save the captured image as a boundary, compare an imaging condition at a timing when an instruction including an intention to save a current captured image is issued with an imaging condition at a timing when an instruction including an intention to save a previous captured image is issued, extract a common condition and a differential condition of imaging conditions between a previous report creation period and a current report creation period, and output report creation information in which the history information divided for each of the report creation periods, and the captured image and the differential condition corresponding to the history information are associated with each other; and a report retention unit configured to create a report for each of the report creation periods based on the report creation information, and record the created report.

Advantageous Effects of Invention

According to the invention, it is possible to easily ensure validity of an observation image.

BRIEF DESCRIPTION OF DRAWINGS

FIG. 1 shows a configuration example of a charged particle beam apparatus according to a first embodiment of the invention.

FIG. 2 shows an example of an operation screen of an input and output device in FIG. 1.

FIG. 3 shows an example of a report corresponding to FIG. 2.

FIG. 4 shows a method of searching for a process leading up to imaging.

FIG. 5 shows a configuration example of a charged particle beam apparatus according to a second embodiment of the invention.

FIG. 6 shows a configuration example of a charged particle beam apparatus according to a third embodiment of the invention.

FIG. 7 shows a configuration example of a charged particle beam apparatus according to a fourth embodiment of the invention.

DESCRIPTION OF EMBODIMENTS

Hereinafter, embodiments of the invention will be described in detail with reference to the drawings. In all the drawings for showing the embodiments, the same members are denoted by the same reference numerals in principle, and repeated description thereof is omitted.

First Embodiment

<Configuration of Charged Particle Beam Apparatus>

FIG. 1 shows a configuration example of a charged particle beam apparatus according to a first embodiment of the invention. A charged particle beam apparatus 100 according to the embodiment is a device that emits a charged particle beam to a sample. Hereinafter, a device that acquires an observation image of a sample by emitting a charged particle beam to the sample, such as a scanning electron microscope (SEM), will be described as an example. In addition, the embodiment is assumed to be used by a plurality of persons. Here, a case where a first user 101 and a second user 102 use the device will be described as an example, and the device is usable by three or more users.

The charged particle beam apparatus 100 includes an image acquisition device 103, a first input and output device 110, a second input and output device 130, and the like. The first input and output device 110 is a device used by the first user 101, and the second input and output device 130 is a device used by the second user 102. The image acquisition device 103, the first input and output device 110, and the second input and output device 130 are connected by wire, wirelessly, or via a network (for example, the Internet or an internal network), and can transmit and receive various types of information therebetween, such as a conversation document, a conversation intention, a control signal, a captured image, and an imaging condition to be described later. Hereinafter, the first input and output device 110 and the second input and output device 130 may be referred to as input and output devices.

The image acquisition device 103 includes a charged particle gun (for example, an electron gun) that emits charged particles (for example, electrons) to a sample, a lens that controls a trajectory of the charged particles, a stage on which the sample is placed, a detector that detects secondary particles and the like emitted from the sample after the charged particles are emitted thereto, a communication interface that performs communication with the input and output device, and the like (all not shown). The image acquisition device 103 emits the charged particles from the charged particle gun based on a control signal received from the input and output device and detects, by the detector, the secondary particles emitted from the sample. The image acquisition device 103 generates an observation image of the sample based on the secondary electrons detected by the detector. The image acquisition device 103 transmits the generated observation image to the input and output device. The image acquisition device 103 may store the generated observation image in a storage device (not shown) in the image acquisition device 103.

The first input and output device 110 and the second input and output device 130 have the same configuration. Therefore, the first input and output device 110 will be described as an example to explain a configuration of the input and output device.

The first input and output device 110 receives an input operation performed by the first user 101 and controls the image acquisition device 103 by transmitting a control signal based on the input operation. The first input and output device 110 receives, from the image acquisition device 103, various types of information such as the observation image generated by the image acquisition device 103 and state data indicating a state of the image acquisition device 103. The first input and output device 110 shares the observation image and a process leading up to imaging of the observation image with the second input and output device 130.

As shown in FIG. 1, the first input and output device 110 includes a speaker 111, a microphone 112, an instruction analysis unit 113, a control unit 114, a history retention unit 115, a difference analysis unit 116, a report retention unit 119, and a monitor 120.

The first input and output device 110 includes the microphone 112, the speaker 111, and the monitor 120 which are man-machine interfaces. The first input and output device 110 requires a computer such as a CPU that implements calculation of the instruction analysis unit 113 and the difference analysis unit 116, a storage device that implements functions of the history retention unit 115 and the report retention unit 119, and a communication interface that transmits and receives information to and from the image acquisition device 103 and an input and output device of another user participating in an experiment. Therefore, as the input and output device, for example, an information processing terminal such as a smartphone, a tablet terminal, or a personal computer (PC) can be used. When a software program is executed by a computer of the information processing terminal, functional blocks such as the instruction analysis unit 113 and the difference analysis unit 116 are implemented.

In addition, the input and output device 110 used by the first user 101 and the input and output device 130 used by the second user 102 have the same function. However, it is necessary to perform time synchronization between these devices.

The microphone 112 acquires voice instruction issued to the charged particle beam apparatus 100 by the first user 101 and voice of discussion between the first user 101 and other users including the second user 102. The microphone 112 converts the acquired voice into voice data and outputs the voice data to the instruction analysis unit 113. In this way, information including thinking of the user is input to the charged particle beam apparatus 100 as the voice data.

An input device 121 is a device such as a keyboard or a mouse through which a document is inputted by an operation of the user. The input device 121 may be, for example, a software keyboard displayed on the monitor 120. The software keyboard may be operated by a mouse or may be operated by the monitor 120 having a function as a touch panel. For example, the first user 101 can perform an input operation by inputting a document to an instruction input area 215 by using a keyboard and clicking a transmission button 216 by using a mouse. In this way, the user can perform an input operation to the first input and output device 110 by both inputting voice via the microphone 112 and inputting text data or the like by the input device 121.

The instruction analysis unit 113 analyzes a conversation uttered by the user received from the microphone 112, and extracts, from the conversation, an instruction content for the image acquisition device 103. The instruction analysis unit 113 performs language understanding on the voice data received from the microphone 112. Specifically, by using a deep learning model (first deep learning model) trained by a pair of a learning conversation (voice data) and a learning document (character string data) that is a document of the conversation, the instruction analysis unit 113 generates a conversation document as character string data based on a conversation (voice data) of the first user 101. The deep learning model used here is, for example, a long-short term memory (LSTM), and is not limited thereto.

Next, by using a deep learning model (second deep learning model), for example, a recurrent neural network (RNN) trained by a pair of the learning document (character string data) and a learning intention that is a conversation intention corresponding to the learning document, the instruction analysis unit 113 recognizes and generates a conversation intention of the first user 101 based on the conversation document generated by the deep learning model. In this way, the instruction analysis unit 113 performs language understanding on the voice data and outputs the conversation document and the conversation intention to the control unit 114 and the history retention unit 115.

The control unit 114 controls the image acquisition device 103 based on a processing result of the language understanding of the voice data in the instruction analysis unit 113. The control unit 114 generates a control signal of the image acquisition device 103 according to the conversation intention of the first user 101 received from the instruction analysis unit 113 and transmits the generated control signal to the image acquisition device 103.

The control unit 114 receives a response signal from the image acquisition device 103 as a control result based on the control signal. The control unit 114 outputs the received response signal to the speaker 111, the history retention unit 115, the difference analysis unit 116, and the report retention unit 119. The control unit 114 may generate a signal based on the response signal and output the generated signal.

A content of the response signal is conveyed from the speaker 111 to the first user 101 by voice. Accordingly, for example, the first user 101 can check whether the content instructed by the conversation is accurately conveyed to the image acquisition device 103. In addition, even when an instruction is repeatedly issued to the image acquisition device 103, the first user 101 can check whether a content of the instruction is conveyed each time the instruction is issued, and can perform a response operation. In addition, as will be described later, the control unit 114 may display, in terms of text on the monitor, a conversation of each user and a response of the image acquisition device 103 to an instruction of the user.

In addition, the control unit 114 transmits the conversation document and the conversation intention of the conversation uttered by the first user 101 to an input and output device of another user participating in the experiment. Similarly, the control unit 114 receives a conversation document and a conversation intention of a conversation uttered by another user from an input and output device of the user who utters the conversation. The control unit 114 outputs the conversation document and the conversation intention of the other user to the history retention unit 115.

The control unit 114 also has a function as a communication interface that transmits and receives information between the first input and output device 110 and the image acquisition device 103. In addition, the control unit 114 also has a function as a communication interface that transmits and receives information between the first input and output device 110 and the second input and output device 130. The function of the communication interface may also be provided separately from the control unit 114. The image acquisition device 103 and the second input and output device 130 may use different communication interfaces.

The control unit 114 implements each functional block of the first input and output device 110 by executing a software program on a computer such as a CPU. Alternatively, a part of functional blocks of the input and output device 110 may be implemented by hardware.

The history retention unit 115 records, as history information, the conversation document and the conversation intention of the first user 101 received from the instruction analysis unit 113, a response (for example, a response signal in a command format) received from the control unit 114, a conversation document and a conversation intention of another user, and the like. At this time, the history retention unit 115 records the conversation document, the conversation intention, and the response signal in association with a user ID of the user who utters the conversation and time when the conversation is uttered. That is, the history information includes the user ID of the user who utters the conversation and the time when the conversation is uttered.

The history retention unit 115 and the report retention unit 119 include a storage device. The storage device may be a non-volatile memory such as a flash memory or a volatile memory such as an SRAM or a DRAM.

The difference analysis unit 116 divides a report creation period using a timing when the user issues an instruction including an intention to save a captured image as a boundary. The history information recorded in the history retention unit 115, a captured image 117 and an imaging condition 118 output from the control unit 114 are input to the difference analysis unit 116. The difference analysis unit 116 compares an imaging condition in a current report creation period with an imaging condition in a previous report creation period and extracts a common condition and a differential condition of the imaging conditions between the previous report creation period and the current report creation period. The difference analysis unit 116 outputs, as report creation information to the report retention unit 119, information in which history information divided for each of the report creation periods, the captured image 117 and the differential condition corresponding to the history information, and the like are associated with each other. The common conditions of the imaging conditions are separately output to the report retention unit 119.

The captured image 117 is a plurality of images saved by the image acquisition device 103. The imaging condition 118 is a condition such as a control value set in the image acquisition device 103 when the image acquisition device 103 saves the captured image 117 or a measurement value obtained from a sensor.

The report retention unit 119 creates and records a report using the report creation information and the common condition of the imaging conditions received from the difference analysis unit 116. At this time, it is desirable that the report retention unit 119 records the report after converting the report into a format that can be viewed on the monitor 120 or the like such that the report is smoothly displayed when there is a report writing instruction to be described later. In addition, the report retention unit 119 also records back data in association with the report creation information such that displaying and hiding of each item in the report can be dynamically switched.

The first user 101 can view the report that is output to and displayed on the monitor 120 of the first input and output device 110. In addition, the report may also be output to and printed by a printer that can print on a paper medium.

<Operation Screen of Input and Output Device>

Next, an operation screen displayed on the input and output device will be described. In addition, an operation example of the input and output device and the image acquisition device will also be described.

FIG. 2 shows an example of the operation screen of the input and output device in FIG. 1. Here, an operation screen displayed on the first input and output device 110 will be mainly described, and a case where the operation screen is applied to the second input and output device 130 may also be described as necessary.

As shown in FIG. 2, an operation screen 200 is displayed on the monitor 120, and includes a conversation display area 201, the instruction input area 215, the transmission button 216, an observation image display area 220, a condition display area 221, a log-in and log-out button 230, a mute button 231, a report writing button 232, and a report reading button 234.

In the conversation display area 201, text corresponding to a conversation (conversation document) of the user of the charged particle beam apparatus 100 and a response (response signal) from the image acquisition device 103 in response to an instruction of the user are displayed.

When there is voice received from the first user 101, an account name 202 of the first user 101 and a call-out 203 of an input conversation of the first user 101 are associated with each other and displayed as one set in the conversation display area 201. A content of the call-out 203 is text display of the conversation document of the first user 101 output from the instruction analysis unit 113.

The user participating in the experiment issues an instruction to the image acquisition device 103 by a conversation while referring to an observation image displayed in the observation image display area 220 and an imaging condition of a captured image displayed in the condition display area 221, which will be described later.

In the example in FIG. 2, the conversation of the call-out 203 is "align the optical axis". The instruction analysis unit 113 generates the conversation document of the first user 101 based on the voice received from the microphone 112, and outputs the generated conversation document to the control unit 114. The control unit 114 outputs the input conversation document to the monitor 120, and the monitor displays the input conversation document on a left side in the conversation display area 201 of the operation screen 200.

In addition, the control unit 114 transmits the input conversation document to the second input and output device 130. A control unit of the second input and output device 130 outputs the received conversation document of the first user 101 to a monitor, and the monitor displays the input conversation document in a conversation display area of an operation screen. In this way, conversations of all the users are displayed in real-time on input and output devices of participants participating in the experiment, and thus the instruction content issued to the image acquisition device 103 can be shared.

In addition, the image acquisition device 103 transmits the response signal not only to the first input and output device 110 but also to the input and output devices of all the users participating in the experiment. Accordingly, the response content of the image acquisition device 103 in response to the instruction of the user is displayed on the input and output devices of all the users.

The account name 202 displays an ID for specifying the first user 101 in a character string, and for example, "participant A" is displayed in FIG. 2. In addition to the account name 202 and the call-out 203, time when the voice is input may be displayed together.

In addition, based on the conversation "align the optical axis" in the call-out 203, the instruction analysis unit 113 recognizes that the conversation is an instruction issued to the image acquisition device 103, extracts a conversation intention of the conversation, and outputs the extracted conversation intention to the control unit 114. The control unit 114 transmits, to the image acquisition device 103, a control signal generated based on the conversation intention received from the instruction analysis unit 113.

A call-out 204 in FIG. 2 is text of a response from the image acquisition device 103 in response to the instruction "align the optical axis" from the first user 101. The image acquisition device 103 transmits a response signal in response to the control signal to the control unit 114 of the first input and output device 110. The control unit 114 outputs the received response signal to the monitor 120, and the monitor displays text corresponding to the input response signal as the response to the instruction of the user on a right side in the conversation display area 201.

In addition, the image acquisition device 103 transmits the response signal not only to the first input and output device 110 but also to the input and output devices of all the users participating in the experiment. Accordingly, the response content of the image acquisition device 103 in response to the instruction of each user is displayed on the input and output devices of all the users.

In FIG. 2, "voice operation system" is displayed as an account name corresponding to the call-out 204, and any other expression may be used as long as the user can recognize the response of the image acquisition device 103.

The response in the call-out 204 is "perform alignment". In this way, the image acquisition device 103 responds to the instruction "align the optical axis" of the first user 101 by performing "alignment" of the optical axis. Thereafter, although not shown in FIG. 2, the image acquisition device 103 performs alignment of the optical axis and transmits a captured image after the alignment to the input and output devices of all the users.

Thereafter, the first user 101 instructs the image acquisition device 103 to capture an image at an increased magnification by a conversation in a call-out 205. The image acquisition device 103 responds by capturing an image at an increased magnification, and this response is displayed as a call-out 206. The image acquisition device 103 transmits the captured image captured at the changed magnification and a changed imaging condition to each input and output device. Then, a report is created at this timing. The report includes the conversations in the call-outs 203 to 206, conversation intentions corresponding to the instructions issued by the conversations in the call-outs 203 and 205, the captured image acquired based on the instruction of the conversation in the call-out 205, the imaging condition, a differential condition and a common condition at that time, and the like.

While the first user 101 and the second user 102 view the captured image displayed on the respective input and output devices, the first user 101 inquires of the second user 102, through a conversation in a call-out 207, about the newly captured image. Since the conversation "how is it?" in the call-out 207 is not an instruction issued to the image acquisition device 103, the instruction analysis unit 113 only creates a conversation document and does not create any conversation intention.

In addition, in response to the conversation in the call-out 207, the second user 102 expresses a view that "it is desirable to make the internal structure slightly clearer" in a conversation in a call-out 208. The conversation in the call-out 208 is "it is desirable to make the internal structure slightly clearer", which does not issue any instruction to the image acquisition device 103, so that an instruction analysis unit of the second input and output device 130 only creates a conversation document and does not create any conversation intention.

Then, the second user 102 issues an instruction "adjust brightness and save again" in a conversation in a call-out 209. The instruction analysis unit of the second input and output device 130 creates and outputs a conversation document and a conversation intention corresponding to the conversation in the call-out 209.

In response to the instruction issued by the conversation in the call-out 209, the image acquisition device responds in a response in a call-out 210 that brightness is adjusted to capture an image. Then, the image acquisition device 103 acquires a captured image whose brightness is adjusted and transmits the captured image and an imaging condition thereof to each input and output device.

Then, a report is created again at this timing. The report includes the conversations in the call-outs 207 to 210, a conversation intention corresponding to the instruction issued by the conversation in the call-out 209, the captured image acquired based on the instruction of the conversation in the call-out 209, the imaging condition, a differential condition and a common condition at that time, and the like.

Although a case where the conversation document and the conversation intention are created based on the conversation uttered by the user is described so far, a document may also be input into the instruction input area 215 by using the input device 121 (may be implemented by software) such as a keyboard, and the input may be made by voice from the user by an instruction using the transmission button 216. In this case, the input document input by the user is the conversation document, and the instruction analysis unit 113 creates a conversation intention based on the input document. That is, in this case, the instruction analysis unit 113 may not create any conversation document.

In the observation image display area 220, the captured image acquired by the image acquisition device 103 is displayed as an observation image in real-time. The first user 101 and the second user 102 make a conversation between users and instruct the image acquisition device 103 while referring to the observation image.

In the condition display area 221, an imaging condition of a captured image set in the image acquisition device 103, that is, an observation condition of the sample is displayed. In the condition display area 221, conditions such as a control value or a measurement value obtained from a sensor are displayed as shown in FIG. 2 as the imaging condition of the captured image. The first user 101 or the second user 102 determines a condition to be set next based on these conditions and issues an instruction to the image acquisition device by voice or by document received from the input device.

As shown in FIG. 2, the imaging condition includes, for example, an imaging magnification, an acceleration voltage, a working distance (WD), a detection signal, and a stage position (X, Y). Here, examples of the detection signal include secondary electrons (SE), reflected electrons, X-ray, Auger electrons, analysis contrast, Z contrast, and a focused ion beam.

The log-in and log-out button 230 is a button for opening a window so as to input the user ID. When the user ID is input, input of a password may be requested as necessary. In addition, when a plurality of users participate in the experiment, linkage information for linking the input and output devices of the users may be input into the window. Examples of the linkage information include a unique conference name and a list of connection destination IP addresses managed by a certain server.

The mute button 231 is a button for turning off acquisition of voice signals. By providing the mute button 231, it is possible to prevent a voice signal irrelevant to the experiment from being processed. In this case, the button is turned on only when no conversation is to be input. In addition, the mute button 231 may be changed to a button for starting input of a conversation. In this case, this button is turned on only when a conversation is to be input.

In addition, like a speaker (AI speaker) using artificial intelligence, on and off of conversation input may be switched by a key word. In this case, the mute button 231 or the button for starting conversation input may still be provided.

The report writing button 232 is a button for outputting a report recorded in the report retention unit 119. When the report writing button 232 is pressed, the report is displayed on the monitor 120 in a viewable format. In addition, the report may also be printed from a printer. Since reports are recorded in the report retention unit 119 in a viewable format, a burden of creating reports and collecting information from a large number of reports routinely performed by the user is reduced.

The report reading button 234 is a button used for conducting an experiment using an already generated report. When the report reading button 234 is pressed, the report recorded in the report retention unit 119 is read. In addition, when the report is to be read, a list of reports may be displayed on the monitor 120 first, and only a report selected by the user from the list may be read.

For example, the control unit 114 extracts latest imaging conditions among common conditions and differential conditions in the report selected by the user, and collectively sets the extracted imaging conditions in the image acquisition device 103. In addition, a differential condition may be appropriately selected from a plurality of conditions in the report. Accordingly, even when the experiment is temporarily interrupted, the experiment can be resumed under the same conditions as long as a report at that time is retained.

In addition, when validity of data described in the report is questioned, the report is read by pressing the report reading button 234, and it is possible to perform re-observation under the same imaging condition by referring to the read report. Accordingly, if the same observation image is obtained, the validity of the data can be verified. Alternatively, when the validity of the data cannot be determined due to data insufficiency, it is possible to acquire the data later.

<Example of Created Report>

Next, an example of a report created in the embodiment will be described. FIG. 3 shows an example of the report corresponding to FIG. 2. A report REP in FIG. 3 includes a title description area 301, a comment insertion button 302, a save button 303, a common condition description area 310, a first data set description area 320, a second data set description area 330, and the like.

In the title description area 301, an experiment title input by the user is displayed. In addition, the user can add information for specifying the experiment as necessary, such as experiment date and time. Accordingly, readability and searchability of an experiment report can be improved.

The comment insertion button 302 is a button used to insert text or voice data into the report REP for the purpose of adding an item insufficient in the experiment, correcting an error, or the like.

The save button 303 is a button used, when an output report is edited, to save the edited report in the report retention unit 119. Accordingly, even when data is organized after the experiment, the report can be centrally managed in the report retention unit 119.

The common condition description area 310 is an area in which a common condition among imaging conditions is displayed. In the common condition description area 310, items in the common condition of the report are displayed. However, an item to be displayed as the common condition may be selected for each experiment by pressing a common condition edition button 311. For example, as for a sample on which EDS analysis is performed for elemental analysis, unlike a sample on which no EDS analysis is performed, an emission current may be displayed as the common condition.

In the first data set description area 320, a first captured image 321 is displayed. In addition, a first differential condition 322 extracted by the difference analysis unit 116 is displayed in the vicinity of the first captured image 321 (immediately below the captured image in FIG. 3) as information describing a difference between the first captured image 321 and other captured images. A first delete button 323 is displayed on the first captured image 321. When the first delete button 323 is pressed, the first data set description area 320 is deleted from the report. At this time, a part of display contents may be integrated with the second data set description area 330.

Further, in the first data set description area 320, a first imaging process 324 is displayed, which shows a list of intentions, details, and procedures through which the first captured image 321 is acquired. The first imaging process 324 shows a history divided by the difference analysis unit 116 using a timing when the captured image 321 is saved as a boundary. For example, as shown in FIG. 3, the first imaging process 324 includes time when a conversation is uttered (recorded), a user ID of a user who utters the conversation, a conversation document, and an operation performed on the image acquisition device 103 based on the conversation.

In addition, as the first imaging process 324, items such as a response of the image acquisition device 103, an intermediate output of the instruction analysis unit or the difference analysis unit in each input and output device, and a desired measurement value may be displayed in addition to those described above.

Similarly to the first data set description area 320, in the second data set description area 330, a second captured image 331, a second differential condition 332, and a second imaging process 334 are displayed. A second delete button 333 is displayed on the second captured image 331.

According to the report REP in FIG. 3, in an experiment conducted on month XX day YY, in year ZZZZ, two images with different contrasts in the same field of view are captured at a magnification of 30,000 times. According to the report in FIG. 3, a participant A and a participant B participate in the experiment, and it is also possible to read an intention of brightness adjustment for improving a contrast of an internal structure and a detail that the participant B is not satisfied with quality of the first captured image 321. When the report does not satisfy a predetermined requirement and imaging is performed again, contents in the first data set description area 320 may not be described in the report.

When the first delete button 323 is pressed, the first captured image 321 and the first differential condition 322 are deleted from the report REP. The first imaging process 324 may be integrated into the second imaging process 334 since a process leading up to obtainment of the second captured image 331 is described therein.

In addition, "contrast: +1" displayed in the second differential condition 332 is obtained by extracting an imaging condition changed between the first captured image 321 and the second captured image 331. Therefore, when the first data set description area 320 is deleted, the changed imaging condition is not extracted, and thus the second differential condition 332 may be blank.

<Search for Process Leading Up to Imaging>

FIG. 4 shows a method of searching for a process leading up to imaging. A search screen 400 shown in FIG. 4 includes a search content input section 401, a search button 402, an imaging process 403, a highlight 404, a captured image 405, a selection button 406, an OK button 407, and a cancel button 408.

Here, the participant A (the first user 101) participates in an experiment of observing a sample A, a sample B, and a sample C and has no knowledge about how to set an imaging condition for a sample D to be observed for the first time, and thus it is assumed that the imaging condition is set by using a function of searching for a process leading up to imaging.

First, the participant inputs, into the user search content input section 401, "observe an internal structure of a plating process in a milled cross section of sample D", which is an observation purpose, and presses the search button 402.

Since a conversation document recorded in the report retention unit 119 includes thinking leading up to obtainment of a target observation image and contents of discussion, for example, the control unit 114 searches reports recorded in the report retention unit 119 by using the observation purpose input here as a search key word, and extracts a sentence similar to the search key word.

On the search screen 400, for example, the imaging process 403 including a conversation document matching with or similar to the search key word is displayed as a search result. In addition, in the imaging process 403, a portion that matches with or is similar to the search key word is displayed by the highlight 404. In FIG. 4, the highlight 404 is indicated by hatching, and the highlight 404 can also be implemented by using a conspicuous color instead of hatching. On the search screen 400, the captured image 405 corresponding to the imaging process 403 extracted in the search is displayed side by side with the imaging process 403.

In FIG. 4, data sets of three reports extracted by the search are listed. Among these data sets, the participant A selects, by the selection button 406, a data set determined to be appropriate for the sample D to be observed for the first time, and presses the OK button 407. Then, the control unit 114 acquires, from the report retention unit 119, a common condition and a differential condition in the selected data set, and sets the acquired conditions in the image acquisition device 103.

When search results do not include any data set that can be determined to be appropriate, by pressing the cancel button 408, it is possible to start the observation of the sample D without changing conditions in the image acquisition device 103.

The search results in FIG. 4 all show examples in which an imaging condition is satisfactorily set to capture an image of an internal structure. Among these search results, the participant A determines that a second condition from the top for capturing an image of an inside structure of a hole of the same metal as the plating process is appropriate, selects a second data set from the top, and starts observation under conditions under which a captured image corresponding the inside of the hole can be acquired.

In this way, instead of reading all reports by the report reading button 234, setting an imaging condition based on a data set of a selected report and restarting the experiment, similar conditions are searched for based on the current observation purpose and the process leading up to imaging recorded in the report retention unit 119, and the imaging condition is set in the image acquisition device 103, so that the imaging condition can be set in a short time.

In addition, for example, a report matching with the observation purpose may be extracted by intentionally describing information such as a key word useful for future search in the title description area 301 or a comment in the report REP in FIG. 3.

<Main Effects According to Embodiment>

According to the embodiment, the instruction analysis unit 113 generates the conversation document in which the conversation uttered by the user is converted into character string data and recognizes, based on the conversation document, the conversation intention of the user including the instruction issued to the image acquisition device. Then, the history retention unit 115 records, as history information, the conversation document, the conversation intention, and the response of the image acquisition device 103 to the instruction to the image acquisition device 103. Then, the difference analysis unit 116 divides the report creation period using a timing when the user issues, to the image acquisition device 103, an instruction including an intention to save a captured image as a boundary, compares an imaging condition at a timing when an instruction including an intention to save a current captured image is issued with an imaging condition at a timing when an instruction including an intention to save a previous captured image is issued, and extracts a common condition and a differential condition of imaging conditions between a previous report creation period and a current report creation period. Then, the difference analysis unit 116 outputs the report creation information in which history information divided for each of the report creation periods, and a captured image and a differential condition corresponding to the history information are associated with each other. Then, the report retention unit 119 creates a report for each of the report creation periods based on the report creation information, and records the created report.

According to this configuration, each report includes contents of the conversation, the captured image, the imaging condition, and the like. Accordingly, an experiment can be easily reproduced by referring to the report, and validity of an observation image can be easily ensured. In addition, when the validity of the observation image is inquired, since an operation leading up to imaging, a conversation leading up to that point, and the like are recorded, it is possible to not only reproduce the experiment but also provide a clear explanation and easily demonstrate the validity of the observation image.

In addition, according to the embodiment, by using the first deep learning model trained by the pair of the learning conversation and the learning document that is a document of the learning conversation, the instruction analysis unit 113 generates the conversation document based on the conversation uttered by the user. According to this configuration, by using the deep learning model, the conversation uttered by the user can be understood.

In addition, according to the embodiment, the first deep learning model is a long-short term memory. According to this configuration, an existing technique can be suitably applied to the charged particle beam apparatus according to the embodiment.

In addition, according to the embodiment, by using the second deep learning model trained by the pair of the learning document and the learning intention that is a conversation intention corresponding to the learning document, the instruction analysis unit 113 recognizes the conversation intention of the user based on the conversation document generated by the first deep learning model. According to this configuration, by using the deep learning model, the conversation intention in the conversation uttered by the user can be recognized.

In addition, according to the embodiment, the second deep learning model is a recurrent neural network. According to this configuration, an existing technique can be suitably applied to the charged particle beam apparatus according to the embodiment.

In addition, according to the embodiment, a plurality of input and output devices are provided, a plurality of users use different ones of the input and output devices, and conversations uttered by all the users participating in the experiment are displayed on the input and output devices of the respective users. According to this configuration, the plurality of users can share contents of the experiment even when the users are located at remote locations. In addition, the experiment can be conducted efficiently.

In addition, according to the embodiment, the control unit 114 reads the report recorded in the report retention unit 119 and sets, in the image acquisition device 103, an imaging condition corresponding to the read report. According to this configuration, it is possible to easily reproduce an experiment.

Second Embodiment

Next, a second embodiment will be described. FIG. 5 shows a configuration example of a charged particle beam apparatus according to the second embodiment of the invention. As shown in FIG. 5, in the embodiment, a plurality of users use one input and output device. An input and output device 510 in FIG. 5 has a configuration in which a speaker recognition unit 501 is added to the input and output device 110 in FIG. 1.

The speaker recognition unit 501 is connected to the microphone 112 and recognizes a speaker who inputs a conversation from the microphone 112 to the input and output device 510. The speaker recognition unit 501 recognizes (identifies and authenticates) the speaker who utters the conversation by speaker recognition, and outputs account information 502 of the recognized speaker to the history retention unit 115.

When performing the speaker recognition, the speaker recognition unit 501 reads learning information necessary for the speaker recognition at the time of logging in by the log-in and log-out button 230 (FIG. 2). The speaker recognition unit 501 learns a feature in voice of the user in advance by using the read information. Alternatively, the speaker recognition unit 501 may use a deep learning model trained in advance by a voice signal received from the microphone 112.

The speaker recognition unit 501 refers to correspondence information in which the user (speaker) is associated with the account information 502 and acquires the account information 502 of the user identified by the speaker recognition. Then, the speaker recognition unit 501 outputs the acquired account information 502 to the history retention unit 115. In this case, even when a plurality of users share one microphone, it is possible to identify the speaker.

The history retention unit 115 records a conversation document and a conversation intention received from the instruction analysis unit 113 in association with the account information 502 received from the speaker recognition unit 501. The correspondence information in which the user (speaker) is associated with the account information 502 is recorded in a storage device in the input and output device 510.

Meanwhile, in the embodiment, a microphone may be provided for each user. For example, one microphone 112 is assigned to one user ID. In this case, at the time of logging in by the log-in and log-out button 230 in FIG. 2, device information for identifying the microphone 112 is assigned to each user. Accordingly, the speaker recognition unit 501 can recognize the speaker by detecting the microphone to which the conversation is input. In addition, the speaker recognition unit 501 may perform speaker recognition on input from each microphone. Accordingly, even when the user inputs a conversation from a microphone different from the microphone registered in advance, the speaker can be accurately identified.

According to the embodiment, a plurality of users use one input and output device 110. The input and output device 110 includes the speaker recognition unit 501 which recognizes the user who utters the conversation. According to this configuration, since necessary hardware can be shared, space and cost required for the input and output device can be reduced.

In addition, according to the embodiment, since a plurality of input and output devices are not used, a configuration for interlocking the input and output devices is unnecessary.

Third Embodiment

Next, a third embodiment will be described. FIG. 6 shows a configuration example of a charged particle beam apparatus according to the third embodiment of the invention. An input and output device 610 in FIG. 6 has a configuration in which a routine extraction unit 601 is added to the input and output device 110 in FIG. 1.

The routine extraction unit 601 reads a plurality of reports from the report retention unit 119, and extracts, from the plurality of read reports, an operation commonly performed in a plurality of experiments.

When the routine extraction unit 601 extracts the common operation from the plurality of reports, the routine extraction unit 601 assigns a routine key word 602 to the extracted operation and registers the routine key word 602 in the instruction analysis unit 113. In addition, the routine extraction unit 601 generates, as a routine command 603, a command in the operation corresponding to the routine key word 602. Further, the routine extraction unit 601 outputs the routine key word 602 and the routine command 603 to the control unit 114. The control unit 114 associates the input routine key word 602 and the corresponding routine command 603 with each other, and registers the input routine key word 602 and the corresponding routine command 603 as one set in the storage device.

The number of routine commands 603 corresponding to one routine key word is not limited to one. A command set including a plurality of commands may correspond to one routine key word.

When the registered routine key word 602 is input by the user, the instruction analysis unit 113 outputs the input routine key word 602 to the control unit 114 and instructs the control unit 114 to execute the routine command 603.

The control unit 114 searches for the routine command 603 corresponding to the routine key word 602 by using the routine key word 602 received from the instruction analysis unit 113. The control unit 114 executes the routine command matching with a search condition and controls the image acquisition device 103.

For example, the user always performs automatic optical axis adjustment and automatic focus adjustment before an experiment, and observes a sample by shortening a working distance (WD) depending on the sample. In such a case, the routine extraction unit 601 extracts, for example, the routine key word 602 "as usual" from a plurality of reports, and generates, as the routine command 603 with respect to the extracted routine key word 602, a command set at least including commands of automatic optical axis adjustment and automatic focus adjustment.

The image acquisition device 103 executes automatic optical axis adjustment and automatic focus adjustment when the user inputs "as usual" by voice before an experiment is started.

According to the embodiment, when the routine extraction unit 601 extracts the common operation from the plurality of reports, the routine extraction unit 601 assigns the routine key word 602 to the extracted operation and registers the routine key word 602 in the instruction analysis unit 113. Then, the routine extraction unit 601 generates, as the routine command 603, a command in the extracted operation. According to this configuration, it is possible to prevent occurrence of a human error during the experiment and to reduce complexity of tasks by extracting and executing tasks that the user routinely performs.

Fourth Embodiment

Next, a fourth embodiment will be described. FIG. 7 shows a configuration example of a charged particle beam apparatus according to the fourth embodiment of the invention. An input and output device 710 in FIG. 7 has a configuration in which a camera 701 and an emotion detection unit 702 are added to the input and output device 110 in FIG. 1 whereas the history retention unit 115 and the difference analysis unit are deleted.

It is generally known that deep learning is effective in an emotion estimation technique for estimating emotion based on data naturally expressed by a person, such as a facial expression, a gesture, eye contact, and voice.

The camera 701 acquires a facial expression image 705 including a facial expression of the first user 101 and outputs the acquired facial expression image 705 to the emotion detection unit 702. In order to detect emotion also from voice of the first user 101, output of the microphone 112 is input to the emotion detection unit 702. By using a deep learning model trained by features in advance, the emotion detection unit 702 detects the emotion of the first user 101 based on at least one of the facial expression image 705 received from the camera 701 and information on the voice of the first user 101 input via the microphone 112.

For example, the emotion detection unit 702 detects the emotion of the user based on the facial expression image 705 and a conversation uttered by the user. For example, when emotion such as "joy" or "surprise" of the user is detected, the emotion detection unit 702 outputs a signal corresponding to the emotion to the instruction analysis unit 113 and the control unit 114. The emotion detection unit 702 outputs voice 704 to the instruction analysis unit 113 and outputs an imaging instruction 703 to the control unit 114. In addition, the emotion detection unit 702 outputs the input facial expression image 705 to the report retention unit 119.

The instruction analysis unit 113 extracts an impression 706 of the user based on the input voice 704, and outputs the extracted impression 706 to the report retention unit 119. In addition, the instruction analysis unit 113 may generate a conversation document and output the conversation document to the report retention unit 119 as in the above embodiments.

The report retention unit 119 creates a report in which the facial expression image 705 received from the emotion detection unit 702, the impression 706 received from the instruction analysis unit 113, the captured image 117 and the imaging condition 118 received from the control unit 114 are associated with each other. The report is recorded in the report retention unit 119 in a viewable format.

The report in the embodiment includes, for example, an observation image observed when the user feels impressed and a state (facial expression and impression) of the user at that time. Specifically, in the report of the embodiment, it is assumed that observation of a sample using the charged particle beam apparatus is a theme to be freely studied by children. It is assumed that the report at this time requires an experimental result and an impression. When a teacher in a school, a parent, or the like is assumed to be a reader of the report, it is conceivable that the reader is interested in what kind of impression the children have when viewing what observation image, or a state of the children during the experiment.

According to the embodiment, for example, it is possible to automatically record, as the report, an observation image in which the children show interest, uttered contents such as impressions, and a facial expression image showing a state at the time of the experiment. In addition, the report in the embodiment can be used as a material for notifying the teacher or the parent of a result of the free study of the children, or as a preparation material for a report to be created by the children.

Although the invention invented by the inventors has been specifically described above based on the embodiments, the invention is not limited to the embodiments, and various modifications can be made without departing from the gist of the invention. For example, the above embodiments have been described in detail to facilitate understanding of the invention, and the invention is not necessarily limited to those including all the configurations described above. In addition, a part of a configuration of one embodiment can be replaced with a configuration of another embodiment, and a configuration of another embodiment can be added to the configuration of the one embodiment. In addition, a part of a configuration of each embodiment may be added to, deleted from, or replaced with another configuration.

All of these are within the scope of the invention, and numerical values, messages, and the like appearing in sentences and drawings are merely examples, and the effects of the invention will not be impaired when different ones are used.

REFERENCE SIGNS LIST

100: charged particle beam apparatus
103: image acquisition device
110, 130, 510, 610, 710: input and output device
113: instruction analysis unit
114: control unit
115: history retention unit
116: difference analysis unit
119: report retention unit
501: speaker recognition unit
601: routine extraction unit
701: camera
702: emotion detection unit

The invention claimed is:

1. A charged particle beam apparatus comprising:
an image acquisition device configured to acquire a captured image of a sample; and
an input and output device configured to operate the image acquisition device, wherein
the input and output device includes
an instruction analysis unit configured to generate a conversation document in which a conversation uttered by a user is converted into character string data and recognize, based on the conversation document, a conversation intention of the user including an instruction to the image acquisition device,
a history retention unit configured to record, as history information, the conversation document, the conversation intention, and a response of the image acquisition device to the instruction to the image acquisition device,
a difference analysis unit configured to divide a report creation period using a timing when the user issues, to the image acquisition device, an instruction including an intention to save the captured image as a boundary, compare an imaging condition at a timing when an instruction including an intention to save a current captured image is issued with an imaging condition at a timing when an instruction including an intention to save a previous captured image is issued, extract a common condition and a differential condition of imaging conditions between a previous report creation period and a current report creation period, and output report creation information in which the history information divided for each of the report creation periods, and the captured image and the differential condition corresponding to the history information are associated with each other, and
a report retention unit configured to create a report for each of the report creation periods based on the report creation information, and record the created report.

2. The charged particle beam apparatus according to claim 1, wherein
by using a first deep learning model trained by a pair of a learning conversation and a learning document that is a document of the learning conversation, the instruction analysis unit generates the conversation document based on the conversation uttered by the user.

3. The charged particle beam apparatus according to claim 2, wherein
by using a second deep learning model trained by a pair of the learning document and a learning intention that is a conversation intention corresponding to the learning document, the instruction analysis unit recognizes the conversation intention of the user based on the conversation document generated by the first deep learning model.

4. The charged particle beam apparatus according to claim 1, wherein
a plurality of the input and output devices are provided,
a plurality of users use different ones of the input and output devices, and
the input and output devices of the users display a conversation uttered by all of the users participating in an experiment.

5. The charged particle beam apparatus according to claim 1, wherein
the input and output device reads the report recorded in the report retention unit and sets, in the image acquisition device, an imaging condition corresponding to the read report.

6. The charged particle beam apparatus according to claim 1, wherein
a plurality of the users use one input and output device, and
the input and output device includes a speaker recognition unit configured to recognize the user who utters the conversation.

7. The charged particle beam apparatus according to claim 1, wherein
the input and output device includes a routine extraction unit configured to read a plurality of the reports from the report retention unit and extract an operation commonly performed in a plurality of experiments from the plurality of read reports, and
when the operation commonly performed is extracted from the plurality of reports, the routine extraction unit assigns a routine key word to the extracted operation, registers the routine key word in the instruction analysis unit, and generates a command in the extracted operation as a routine command.

8. A charged particle beam apparatus comprising:
an image acquisition device configured to acquire a captured image of a sample; and
an input and output device configured to operate the image acquisition device, wherein
the input and output device includes
an emotion detection unit configured to detect emotion of a user based on at least one of a facial expression image and voice information of the user, and
a report retention unit configured to generate a conversation document in which a conversation uttered by the user is converted into character string data, extract an impression of the user from the conversation document, create a report in which the facial expression image and the impression are associated with each other, and record the created report.

9. A report creation method of a charged particle beam apparatus including an image acquisition device configured to acquire a captured image of a sample and an input and output device configured to operate the image acquisition device, the report creation method comprising:
causing the input and output device to generate a conversation document in which a conversation uttered by a user is converted into character string data and recognize, based on the conversation document, a conversation intention of the user including an instruction to the image acquisition device;
causing the input and output device to record, as history information, the conversation document, the conversation intention, and a response of the image acquisition device to the instruction to the image acquisition device;
causing the input and output device to divide a report creation period using a timing when the user issues, to the image acquisition device, an instruction including an intention to save the captured image as a boundary, compare an imaging condition at a timing when an instruction including an intention to save a current captured image is issued with an imaging condition at a timing when an instruction including an intention to save a previous captured image is issued, extract a common condition and a differential condition of imaging conditions between a previous report creation period and a current report creation period, and output report creation information in which the history information divided for each of the report creation periods, and the captured image and the differential condition corresponding to the history information are associated with each other; and
causing the input and output device to create a report for each of the report creation periods based on the report creation information, and record the created report.

* * * * *